US 8,965,420 B2

(12) United States Patent
Gross et al.

(10) Patent No.: US 8,965,420 B2
(45) Date of Patent: Feb. 24, 2015

(54) METHOD AND SYSTEM OF MOBILE DEVICE COMMUNICATION

(75) Inventors: Amit Gross, Tel-Aviv (IL); Alon Reinharz, Nahariya (IL)

(73) Assignee: AirMeUp Ltd., Ramat-Gan (IL)

( * ) Notice: Subject to any disclaimer, the term of this patent is extended or adjusted under 35 U.S.C. 154(b) by 542 days.

(21) Appl. No.: 13/202,986

(22) PCT Filed: Feb. 24, 2010

(86) PCT No.: PCT/IL2010/000156
§ 371 (c)(1),
(2), (4) Date: Aug. 24, 2011

(87) PCT Pub. No.: WO2010/097792
PCT Pub. Date: Sep. 2, 2010

(65) Prior Publication Data
US 2011/0312307 A1    Dec. 22, 2011

Related U.S. Application Data

(60) Provisional application No. 61/154,783, filed on Feb. 24, 2009.

(51) Int. Cl.
*H04W 4/00*   (2009.01)
*H04L 12/58*  (2006.01)
*H04W 4/14*   (2009.01)

(52) U.S. Cl.
CPC ........ *H04L 12/5895* (2013.01); *H04L 12/5855* (2013.01); *H04L 51/14* (2013.01); *H04L 51/38* (2013.01); *H04L 12/5835* (2013.01); *H04L 51/066* (2013.01); *H04W 4/14* (2013.01)
USPC ........ 455/466; 455/445; 455/414.1; 455/425; 455/452.2; 455/452.1; 455/509; 455/450

(58) Field of Classification Search
CPC .......... H04W 4/14; H04W 4/12; H04W 4/16; H04L 51/38; H04L 12/5895; H04L 51/00; H04M 1/72552; H04M 3/42382
USPC .......... 455/426.1, 445, 466, 414.1, 509, 517, 455/411, 425, 422.1, 450, 452.2; 370/400, 370/390, 395.1, 352, 428, 474, 432, 335, 370/342, 397
See application file for complete search history.

(56) References Cited

U.S. PATENT DOCUMENTS

2005/0143104 A1    6/2005  Kim
(Continued)

FOREIGN PATENT DOCUMENTS

WO    WO 03/003650    *  1/2003  .............. H04L 12/00
WO    WO 2010/097792     9/2010

OTHER PUBLICATIONS

International Search Report and the Written Opinion Dated Nov. 3, 2010 From the International Searching Authority Re. Application No. PCT/IL10/00156.

(Continued)

*Primary Examiner* — Joseph Arevalo (57) ABSTRACT

A system of transmitting content, such as text messaging content, among a plurality of mobile communication devices. The system comprises a plurality of transmission management modules installed in a plurality of mobile communication devices, each being adapted to transmit messaging content and a target telephone number via a packet-oriented communication link and a messaging router which receives the content and the target telephone number via the packet-oriented communication link from one of the plurality of mobile communication devices, identifies a target packet-oriented communication address according to the target telephone number and routes the content to another of the plurality of mobile communication devices according to the target packet-oriented communication address.

28 Claims, 7 Drawing Sheets

(56) References Cited

U.S. PATENT DOCUMENTS

2007/0067373 A1    3/2007  Higgins et al.
2007/0250195 A1*  10/2007  Rhoads et al. .................. 700/94
2008/0107110 A1    5/2008  Andou et al.
2009/0177742 A1*   7/2009  Rhoads et al. ................ 709/203

OTHER PUBLICATIONS

International Preliminary Report on Patentability Dated Jun. 21, 2012 From the International Bureau of WIPO Re. Application No. PCT/IL10/00156.

* cited by examiner

METHOD AND SYSTEM OF MOBILE DEVICE COMMUNICATION

RELATED APPLICATIONS

This application is a National Phase of PCT Patent Application No. PCT/IL2010/000156 having International filing date of Feb. 24, 2010, which claims the benefit of priority of U.S. Provisional Patent Application No. 61/154,783 filed on Feb. 24, 2009. The contents of the above applications are all incorporated herein by reference.

FIELD AND BACKGROUND OF THE INVENTION

The present invention, in some embodiments thereof, relates to cellular communication but not exclusively, to methods and systems of managing cellular communication.

One of the most popular communication technologies that have been developed for mobile communications systems is text messaging, in particular the short message service (SMS) that allows mobile users to receive text messages via wireless communication devices, including SMS-capable cellular mobile phones. Mobile and stationary users can send messages to recipient users by entering a text message and the destination address of the recipient user, who can be either a mobile or a non-mobile user.

Based on the ability to send cellular messages, a number of electronic information services have been developed around SMS technology. For instance, electronic information services have integrated SMS into their systems in a manner that allows them to provide a number of services including email-to-SMS and fax-to-SMS, paging-to-SMS, interactive banking, and general information services such as providing financial information. Thus, cellular messaging is not limited to transmitting textual messages between users, but has developed into a general system for wireless communication of electronic information. As a result, an SMS message may include not only text messages entered by mobile and non-mobile users, but may also include e-mail, fax, paging, textual data of e-mail, financial, news, and other electronic information.

Moreover, during the last years, a multimedia messaging service (MMS) standard, which is a standard for a telephony messaging systems that allow sending messages that includes multimedia objects, such as images, audio, video, rich text etc., became very common.

During the last years various developments have changed the manner text messaging, such as SMS communication services, function. For example, U.S. Pat. No. 7,088,990, filed on 8 Aug. 2006 describes a terminal for a communication network, the terminal being capable of supporting a plurality of applications and having means of communicating user messages, such as short messages. The terminal comprises means for receiving user messages having data that comprises characters and a header relating to one of the applications and means for addressing the data to a respective application according to the header. Another example is described in U.S. Pat. No. 7,319,880, filed on 19 Dec. 2001 describes a method for forwarding an SMS message in a mobile communication system where a calling mobile terminal requests transmission of an SMS message to a message center (MC) and the MC determines that a forwarding function is set for a called mobile terminal. If it is set, the MC transmits the SMS message to a destination mobile terminal.

SUMMARY OF THE INVENTION

According to some embodiments of the present invention there is provided a system of transmitting content among a plurality of mobile communication devices. The system comprises a plurality of transmission management modules installed in a plurality of mobile communication devices, each being adapted to transmit messaging content and a target telephone number via a packet-oriented communication link and a messaging router which receives the content and the target telephone number via the packet-oriented communication link from one of the plurality of mobile communication devices, identifies a target packet-oriented communication address according to the target telephone number and routes the content to another of the plurality of mobile communication devices according to the target packet-oriented communication address.

Optionally, each the plurality of transmission management module being adapted to receive the messaging content from a native user interface (UI) of a respective hosting the mobile communication device.

Optionally, the content is a text messaging content.

More optionally, the native user interface is selected from a group consisting of a short message service (SMS) UI, an instant messaging (IM) UI and a multimedia messaging service (MMS) UI.

Optionally, the system comprises a database for storing a plurality of packet-oriented communication addresses in association with a different of a plurality of telephone numbers, the messaging router identifying the target packet-oriented communication address by comparing between the target telephone number and at least some of the plurality of telephone numbers.

Optionally, the packet-oriented communication link is selected from a group consisting of a General packet radio service (GPRS) link, General packet radio service (GPRS) link, EDGE 3G link, wireless application protocol (WAP) link, Wideband Code Division Multiple Access (WCDMA) link, High-Speed Packet Access (HSPA) link, 3GPP long term evolution (LTE) link, a wireless wide area network (WAN) and a local area network (WLAN) link.

Optionally, the messaging receives the content in a hypertext transfer protocol (HTTP) or a TCP\IP protocol message.

Optionally, the content comprises a data storage address, the messaging router extracts the data storage address from the content and uses the data storage address to acquire a data element, the messaging router automatically routes the data element to the another of the plurality of mobile communication.

Optionally, the messaging router automatically routes the data element in a time event defined by at least one rule.

Optionally, the content comprises at least application command indication, another of the plurality of mobile communication devices being configured to perform at least one operation according to the at least application command indication.

According to some embodiments of the present invention there is provided a method of transmitting content between a plurality of mobile communication devices. The method comprises receiving text messaging content designated for a target telephone number from a first mobile communication device associated with a source address, via a first packet-oriented communication link, using the target telephone number to acquire a packet-oriented communication address of a second mobile communication device, and routing the text messaging content to the second mobile communication device according to the packet-oriented communication address so as to allow the second mobile communication device to process the text messaging content.

Optionally, the process the text messaging content comprises presenting the text messaging content to a user.

Optionally, the text messaging content comprises at least one data storage address, the using comprises using the data storage address to extract at least one data element and the routing comprises automatically routing the at least one data element to the packet-oriented communication address.

More optionally, the routing allows the second mobile communication device to store the at least one data element locally before notifying a user thereabout.

More optionally, the at least one data element requires at least 1 megabyte (MB) storage space.

Optionally, the text messaging content comprises at least application command indication; the second mobile communication device automatically operates at least one hosted application according to the application command indication.

More optionally, the at least one hosted application comprises a clock alarm.

More optionally, the at least one hosted application comprises an image capturing application.

More optionally, the at least one hosted application comprises a communication service application.

More optionally, the at least one hosted application comprises a location detection application.

More optionally, the at least one hosted application comprises an address book application, the address book application automatically retrieves a contact in response to the at least application command indication.

Optionally, the text messaging content comprises a password; the second mobile communication device automatically reads the password and operates at least one hosted application in response.

According to some embodiments of the present invention there is provided a mobile communication device. The mobile communication device comprises a user interface which allows a user to designate content and a target address for transmission, a cellular messaging module set to transmit a message to a communication service center via a cellular network, a packet-oriented communication interface set to transmit a message to a messaging router via at least one of a packet-oriented communication network link and a cellular data link, and a transmission management module which selects one of the cellular messaging module and the packet-oriented communication interface to transmit the content to another mobile communication device having the target address.

Optionally, the content is a text messaging content.

Optionally, the mobile communication device comprises a cost estimator which estimates a cost of transmitting the designated content to the target address using at least one of the cellular messaging module and the packet-oriented communication interface, the transmission management module performing the selecting according to the cost.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volitile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to cellular communication but not exclusively, to methods and systems of managing cellular communication.

According to some embodiments of the present invention, there is provided a system and a method of transmitting content, such as text messaging content and /or media files, among a plurality of mobile communication devices, such as cellular phones, via a messaging router. The system includes a plurality of transmission management modules which are installed in the plurality of mobile communication devices. Each transmission management module is adapted to receive messaging content and a target address, such as a telephone number, from a user, for example by extracting inputs from a native user interface of a hosting cellular device. The transmission management module forwards the content and the target address to a messaging router, optionally via a packet based network, such as the internet. The messaging router forwards the content to another mobile communication device according to the target address. For example, if the target address is a telephone number, the messaging router use an address index to match a packet based address thereto and uses the matched packet based address to transmit the content to a receiving mobile communication device, for example as an HTTP or TCP/IP message. The transmission management module of the receiving mobile communication device can now extract the content from the received message and input it to the native UIs of the receiving mobile communication device as a regular SMS, IM and/or MMS.

Optionally, the messaging router and/or the transmission management module include or connected to a cost estimator that estimates the cost of using various communication services and/or links for transmitting the content. In such a manner, the transmission management module may select a transmission method and/or process according to their current costs.

Additionally or alternatively, a user may use the mobile communication device to transmit a data element, such as a file, a video and/or an image or various formats to another mobile communication device. In use the user inputs content that includes a storage address, such as a link, to a certain data element. The messaging router, which receives the data element as described above, extracts the reference from the received content, acquires the data element accordingly, and transmits the data element to another mobile communication device according to the target address. The receiving mobile communication device may store the received data element and provide a local access thereto without requiring from the user to wait for its reception.

Additionally or alternatively, a user may use the mobile communication device to input a content that includes command an application of another mobile communication device. In such an embodiment, the receiving mobile communication device receives the content, extracts the command, and instructs a local application accordingly.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
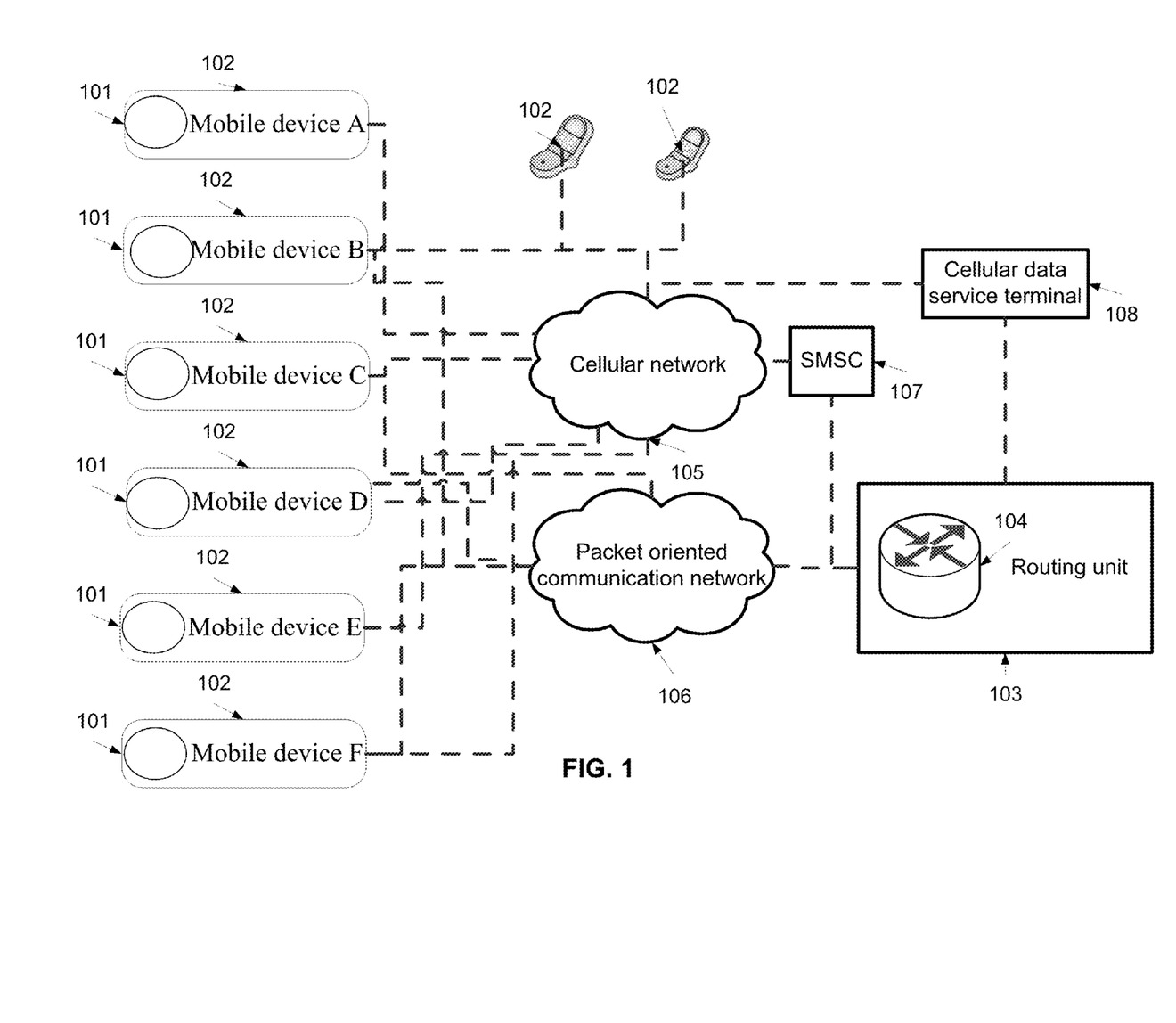
FIG. 1 is a system of transmitting content among a plurality of mobile communication devices using text messaging, according to some embodiments of the present invention.

Reference is now made to FIG. 1, which is a schematic illustration of a system 100 of transmitting content, such as text messaging content, among a plurality of mobile communication devices 102, according to some embodiments of the present invention. The system 100 is based on a plurality of communication management modules 101 which are installed in the plurality of mobile communication devices 102. Some or all of the transmission management modules are adapted to communicate with a messaging router 103 via a packet-oriented communication network 106, such as the internet, for example using a wireless wide area network (WAN) and/or local area network (WLAN) interface, such as Wi-Fi™, 3GPP long term evolution (LTE), and WiMAX™ interface. Additionally or alternatively, some or all of the transmission management modules 102 are adapted to communicate with the messaging router 103 via a cellular data service, such as a General packet radio service (GPRS), General packet radio service (GPRS), EDGE 3G, wireless application protocol (WAP), Wideband Code Division Multiple Access (WCDMA), and High-Speed Packet Access (HSPA). For brevity, the standards of these interfaces and services are incorporated herein by reference.

Optionally, the communication allows each mobile communication device 102 to transmit and/or receive text messaging content in association with target and/or source addresses, such as telephone numbers, for example cellular phone identification numbers, public switched telephone network (PSTN) numbers and/or any indication thereof.

Figure 2:
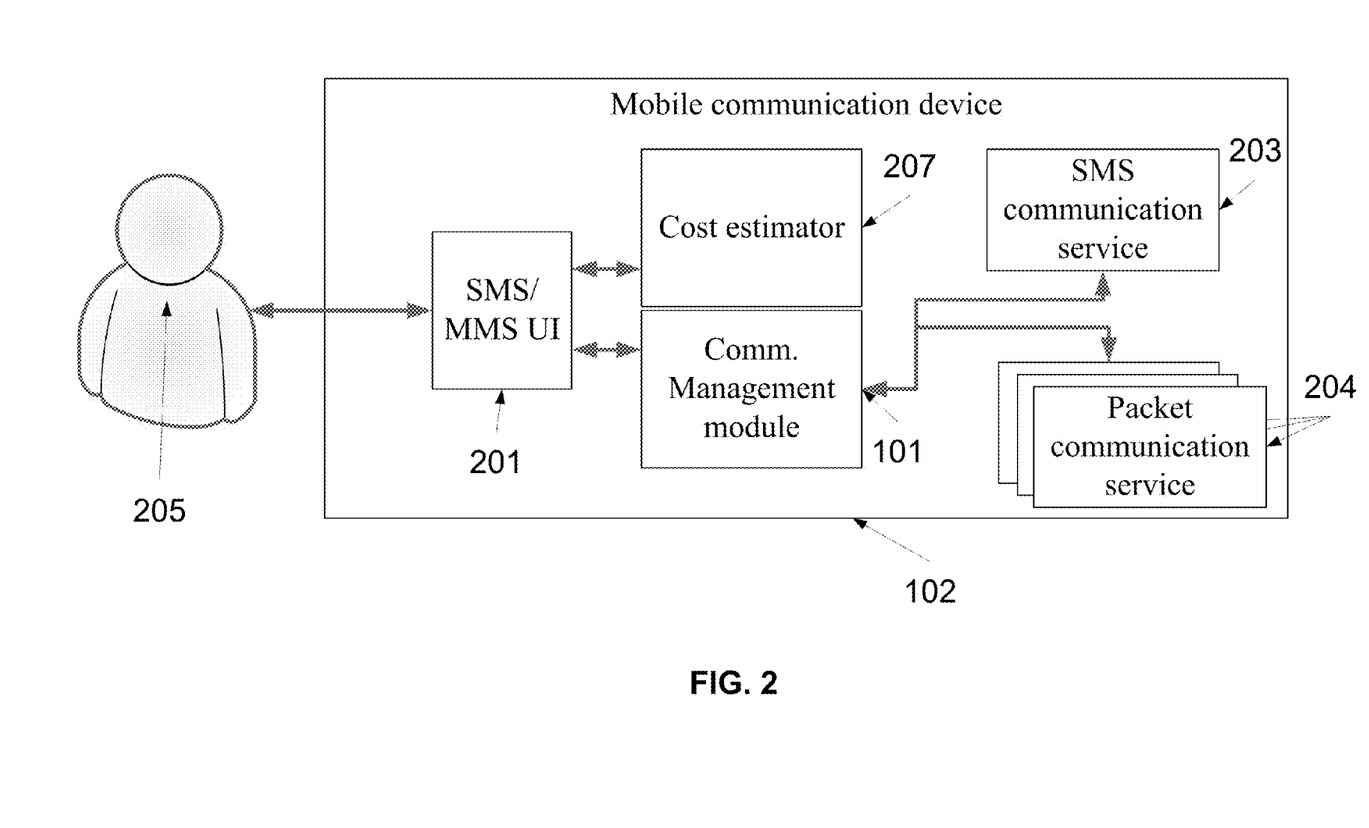
FIG. 2 is a schematic illustration of a user and an exemplary mobile communication device, such as shown in FIG. 1, according to some embodiments of the present invention.

The messaging router 103 is set to receive text messaging content from one mobile communication device 102 and to route it to one or more other mobile communication devices 102. The messaging router 103 includes and/or connected to a database that hosts an index that matches between telephone numbers of the mobile communication devices 102 and the packet based addresses of the plurality of communication management modules 101 which are hosted therein. The index optionally hosts a lookup table or any other dataset that allows matching the telephone numbers of the mobile communication devices 102 and addresses of the communication management modules 101 thereof, for example unique identification (ID) names or addresses, such as a unique system ID, an address which is based on the media access control (MAC) address of the hosting mobile communication device 102, and the like. Optionally, the index is a list of user profile records, each of a user enrolled to a service provided by system. In such embodiments, each user record may include a telephone number of the user and a packet oriented address, such as a unique ID a MAC address, an IP address and the like. The messaging router 103 is designed to receive content, such as text messaging content, for example SMS text content, in association, for example together, with a target address, such as a phone number or a phone number indication, and route the text messaging content to one of the mobile communication devices 102 according to the target address. The routing may be performed via the packet oriented communication network 106 and/or via the cellular network 105, for example via a cellular data service terminal 108, such as an EDGE, GPRS, and/or WAP terminal a cellular service provider, and/or via the SMS center (SMSC) 107 of a cellular service provider as a regular SMS or any other cellular data service terminal 108, such as an MMSC. If the cellular network 105 is a global system for mobile communications (GSM)-based network, the SMSC or the MMSC forwards the cellular message to a related mobile services switching center (MSC), for example as known in the art. The routing may be performed to a gateway of an SMS aggregator. In such a manner, the cost of sending the content may be reduced or controlled even if the target address is a cellular network address. Reference is now also made to FIG. 2, which is a schematic illustration of a user 205 and an exemplary mobile communication device, such as 102 in FIG. 1, according to some embodiments of the present invention. The mobile communication device 102 is adapted to allow the user 205 to use an SMS user interface (UI) and/or a multimedia messaging service (MMS) UI 201 for sending text messaging content. The text messaging content is sent over cellular data links, such as WAP, EDGE, GPRS, EDGE and 3WCDMA, or packet based network links, such as WAN and/or WLAN data links, for example established over Wi-Fi™ and WiMAX™ infrastructure.

The mobile communication device 102, which is optionally a cellular phone, has an SMS communication service module 203, as known in the art, and a packet communication service module 204, such as a cellular data interface and/or WAN/WLAN interface, for example as known in the art and outlined above.

As outlined above the mobile communication device 102 includes a communication management module, such as 101, which manages the transmission of text messages, and optionally additional digital data, such as various media objects, for example images, video and/or audio files.

The communication management module 101 is optionally set to receive outputs of a native text messaging UI of the mobile communication device 102, such as an SMS GUI of Windows Mobile™ OS, Symbian™ OS, Android™ OS, Palm™ OS, Maemo™, MeeGo™, Bada™, and/or Apple iPhone™ OS. For example, the communication management module 101 forwards the text messaging content submitted by a user 205, the source telephone number of the source mobile communication device, and the target telephone number and/or contact identification pertaining to a target address to the messaging router 103 when the user press on the "send" button. In such a manner, a "send" user command does not automatically trigger the sending of the text messaging content using the SMS service communication but rather triggers the activation of the communication management module 101.

The communication management module 101 determines whether the text messaging content is transmitted to a target address identified by the telephone number via the SMS communication service module 203 and/or the packet communication service module 204.

According to some embodiments of the present invention, the communication management module 101 includes a cost estimator 207. The cost estimator 207 is used to estimate the cost of transmitting the inputted content to the messaging router 103. The cost may be calculated according to the values of variables, such as time of the day, a text messaging bundle, an internet service bundle, current network load and load tariff, expected delay, a presence or absence of a connection to a packet based network, the transmission cost and the like. The cost estimator 207 optionally estimate of the total cost of transmitting the received content to the target address via each one of the available routes, allowing the communication management module 101 to select a suitable, for example the least expensive, transmission service and/or method. The cost estimator 207 optionally manages a cost index. The cost index may be updated periodically and/or whenever price is changed and/or whenever the user usage terms are changed. The index may be updated automatically, for example according to transmissions from a central server and/or manually, according to user inputs, optionally, using a designated GUI.

Figure 3:
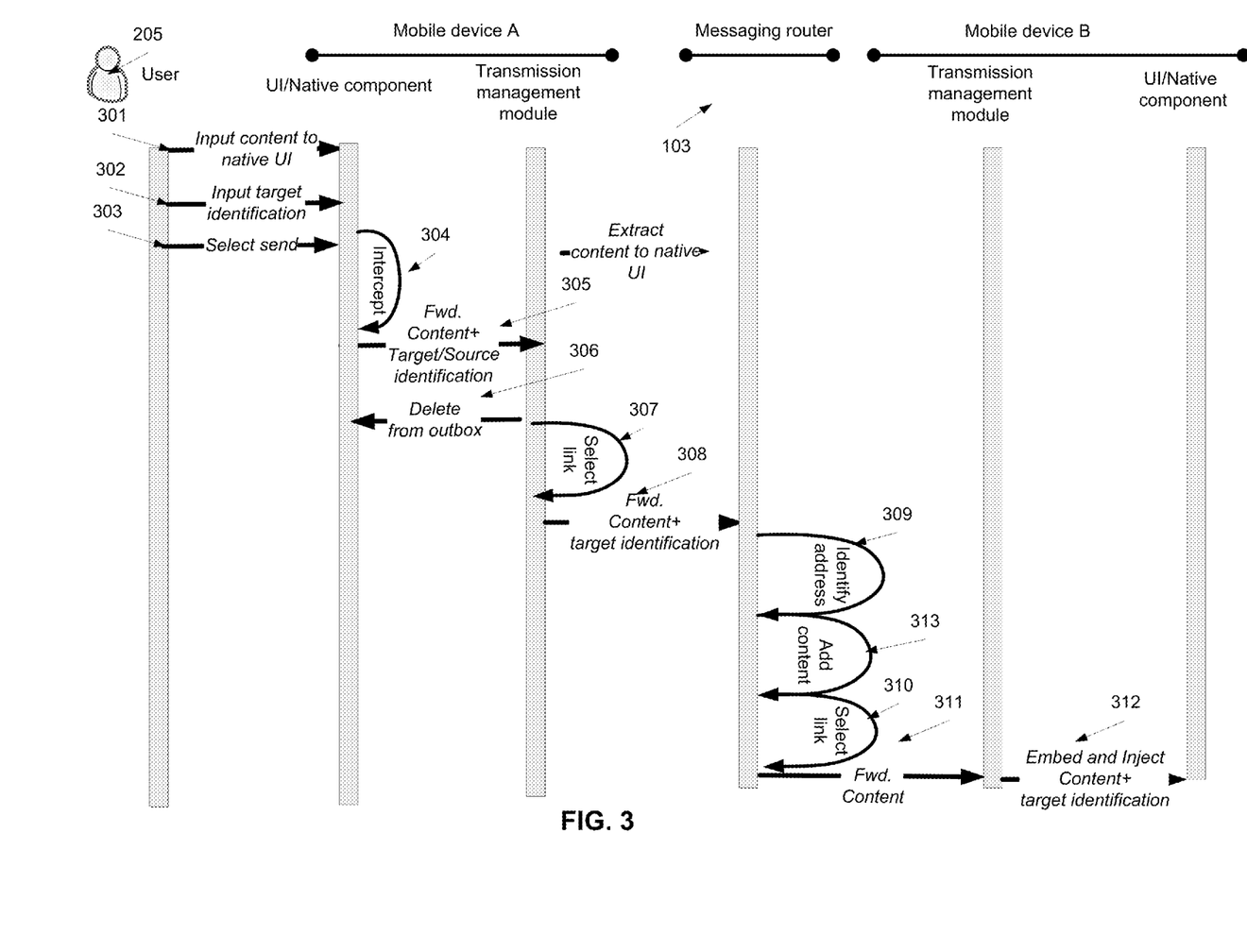
FIG. 3 is a sequence diagram of a process of sending a textual message from one mobile communication device to another via a messaging router, according to some embodiments of the present invention.

Reference is now also made to FIG. 3, which is a sequence diagram of a process of sending a textual message or media content from one mobile communication device 102 to another mobile communication device 102 via the messaging router 103, according to some embodiments of the present invention.

First, as shown at 301, 302, the user 205 uses the native UI of a first mobile communication device 102 for submitting content, such as a text messaging content, and a target identification, for example a telephone number and/or a contact identification. Than, as shown at 303, the user 205 select the send option, for example by pressing the send button. For example, the user 205 invokes the native graphical UI (GUI) dialog box supplied by the mobile communication device 102, and uses it to fill-in a destination telephone number and a content of a text message and presses or otherwise selects send operation in order to send the message to the telephone number.

Than, as shown at 304, the content and the target identification are intercepted, for example from extracted from the outbox folder and/or send SMS folder of the native UI. The intercepted data is forwarded to the transmission management module, as shown at 305, optionally with the target and/or the source address. Optionally, as shown at 306, the intercepted data is deleted from the outbox, thus preventing it from being sent out not via the communication management module 101.

Now, as shown at 307, the communication management module 101 may select a link for transmitting the content, and optionally the target identification, for example the telephone number. Optionally, the selection is performed according to an output of the cost estimator 207, a set of communication rules, optionally set of by the user 205, and/or according to the availability of communication links For example, a TCP/IP message over a WAN/WLAN communication link is selected if the first mobile communication device 102 is currently connected to the packet oriented network 106. A TCP/IP message over a cellular data link is selected if the first mobile communication device 102 is not connected to the packet oriented network 106. An SMS message send via an SMS communication service is selected if the user is not subscribed to cellular data communication services, such as EDGE, WAP, and the like.

Now, if the selected link is a packet oriented link, a message that includes the content, the target identification, and optionally an indication about the sending mobile communication device 102 is sent via the selected link to the messaging router 103, as shown at 308. Optionally, the message is send as a hypertext transfer protocol (HTTP) protocol message and/or TCP/IP protocol message.

The messaging router 103 receives the message and optionally identifies a user record of the target identification. As described above, the user record includes one or more packet oriented addresses that allow forwarding the message thereto via packet oriented and/or cellular data links Optionally, the user record defines user preferences which instructs the messaging router 103 via which route or to which address to transmit the content to the respective user. Optionally, the user record is updated by a designated website and/or by sending a designated SMS to the routing message, for example in a similar manner to the described by numerals 301-307. Optionally, as shown at 313, the messaging router 103 adds content to the message that is about to be sent to the second mobile communication device, for example text, for example promotional content, a reference such as a uniform resource locator (URL) and the like. Optionally, as shown at 310, the messaging router 103 selects the route for transmitting the content according the user preferences and/or a local cost estimator module. The local cost estimator module, which is optionally similar to the cost estimator 207, estimates the price of each possible link, allows selecting the least expensive method or service.

Now as shown at 311, the messaging router 103 transmits the received content, for example text messaging data, to the target identified by the target identification. Optionally, the message is transmitted as a hypertext transfer protocol (HTTP) protocol message and/or TCP \IP protocol message. For example, if the target identification is a phone number, as received from the first mobile communication device 102, the messaging router 103 may identify a matching user record and extract therefrom a unique address. Then, the unique address is used for transmitting the received content, together with identification about the sender, for example the received source address.

The transmitted content, and optionally sender identification, is received by a second mobile communication device 102 and forwarded to the transmission management module 101 thereof. The transmission management module 101 of the second mobile communication device 102 may now extract the received content and optionally covert it for presentation by the native UI of the second mobile communication device 102. For example, if the received content includes text messaging content, it is converted to a format of an SMS and injected into the native SMS inbox of the second mobile communication device 102 as an SMS. It should be noted that the content transmitted between the first and second mobile communication devices may be an image inserted as an MMS via a native MMS UI of the first mobile communication device 102.

Figure 4:
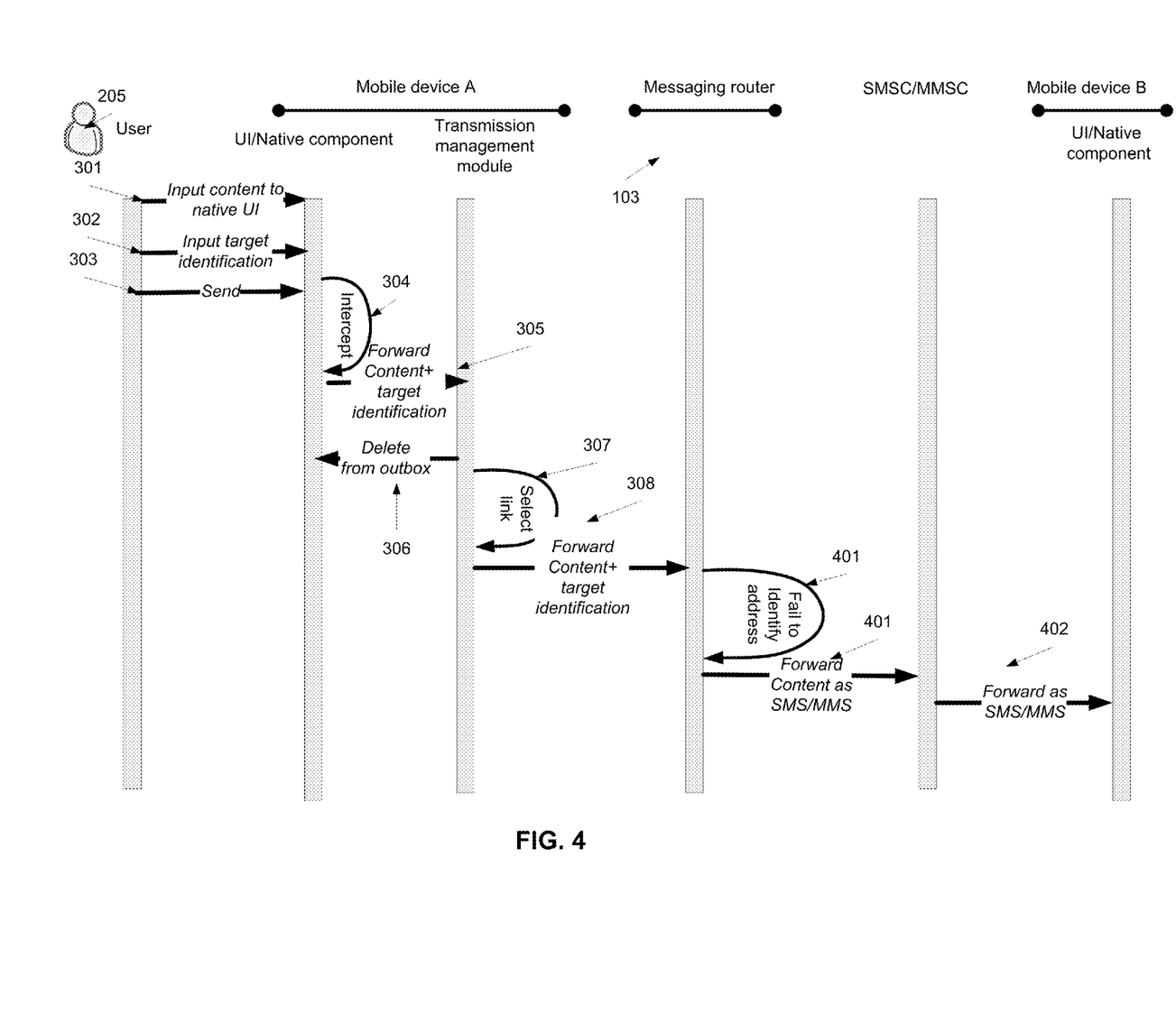
FIG. 4 is another sequence diagram of a process of sending a textual message via a messaging router, according to some embodiments of the present invention.
Figure 5:
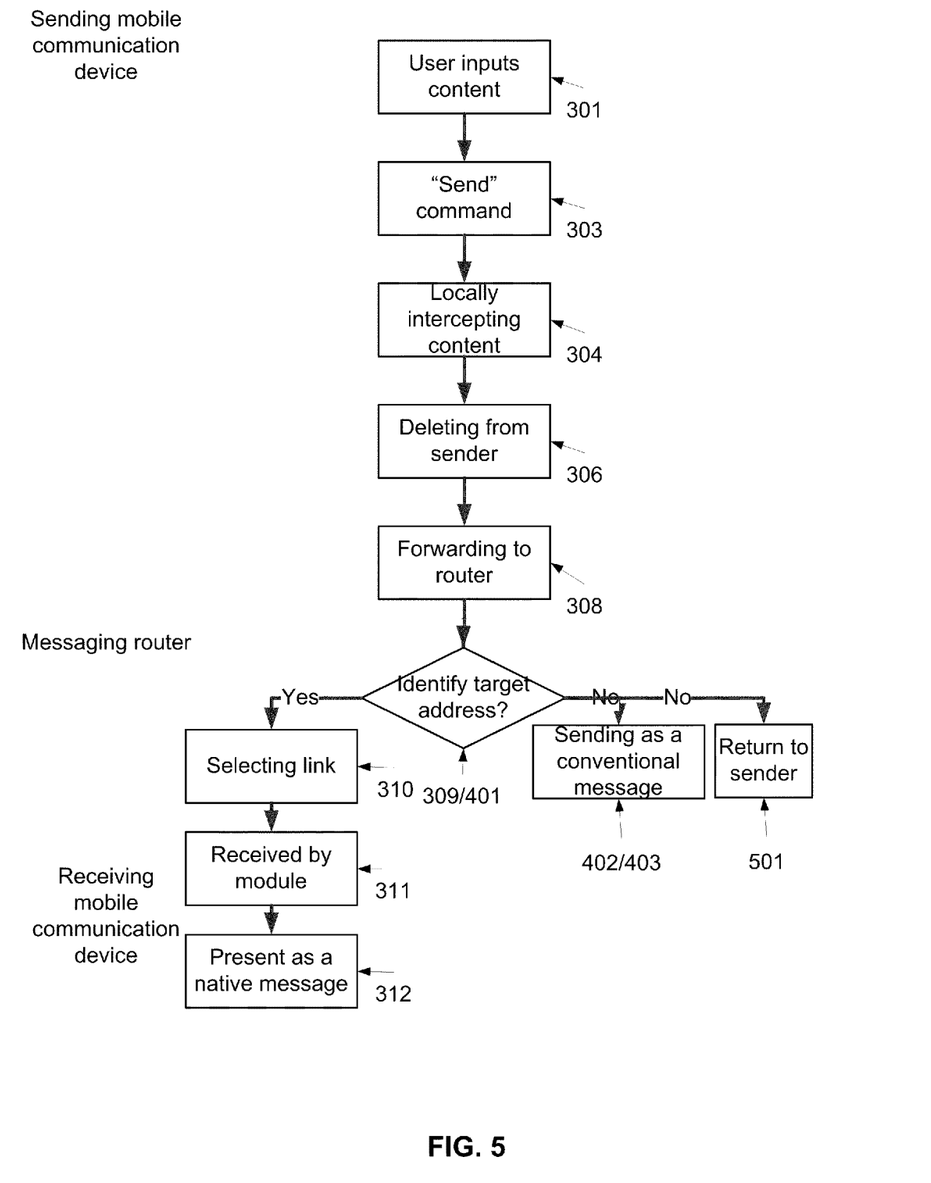
FIG. 5 is a flowchart of a method based on the processes depicted in FIGS. 3 and 4, according to some embodiments of the present invention.

Reference is now also made to FIG. 4, which is another sequence diagram of a process of sending a textual message via the messaging router 103, according to some embodiments of the present invention. In this sequence diagram, numerals 301-308 are as described in relation to FIG. 3; however, in this process the messaging router 103 does not identify any packet oriented address according to the received target identification, as shown at 401 and/or estimates that sending an SMS is a preferred manner to forward the received data. For example, when the received content is associated with target identification, such as a telephone number, which is not identified by the messaging router 103, for example as it is not located in the index defined in the database 104. In such an embodiment, the received content may be send as a regular SMS, an instant messaging (IM) message, or MMS message received from the first device 102 to an SMSC, IM center, or MMS center (MMSC) which route the message to the received identification target, namely the telephone number, as known shown in 402, 403. FIG. 5 is a flowchart of a method based on the processes depicted in FIGS. 3 and 4, according to some embodiments of the present invention. The blocks of the methods are substantially as described above.

Optionally, as shown at 501, if the target address is not identified by the messaging router and/or identified as a target address that does not use a packed based interface, the first mobile communication device 102 is notified, for example by replying to the received content with the received content. In such an embodiment, the transmission management module 101 of the first mobile communication device 102 may instruct the SMS and/or MMS service module of the first mobile communication device 102 to send the content in a regular SMS and/or MMS message.

Reference is now made, once again, to FIG. 1. According to some embodiments of the present invention, the communication management module 101 and optionally, the messaging router 103, are used for allowing a user to send various types of data, in various sizes, to a certain mobile communication device by sending a text message using another mobile communication device. As described above, and shown by 301-308 of FIGS. 3 and 4, the communication management module 101 allows routing text messaging content to the messaging router 103. In such embodiments, a user may create a textual message that includes one or more data storage addresses, referred to herein as references, for example one or more links, and send it to the messaging router 103 seemingly as a as an SMS message. Optionally, the messaging router 103 includes a reference module for identifying references, an indication about one or more references and/or a designated port that is set to receive messages with references. When such a reference is detected, the reference module acquires the referred data element. For example, if the reference is a link to a certain data element, such as a file, an image, a video, or a data entry, the reference module may acquire the data element and optionally coverts it to a message format. The message is now sent to the target address, optionally via a packet oriented data link, for example via the packet based network. Optionally, when the communication management module 101 receives the message, it locally converts it to a message in a format that can be presented on the hosting mobile communication device 102. In such embodiments, the sender may use a packet oriented connection for storing data in a network node, for example a designated storage space allocated thereto. A message with a link, or any other reference to the stored data, may be sent to the messaging router 103, as described above, facilitating the transmission of the allocated data to the target address.

Figure 6:
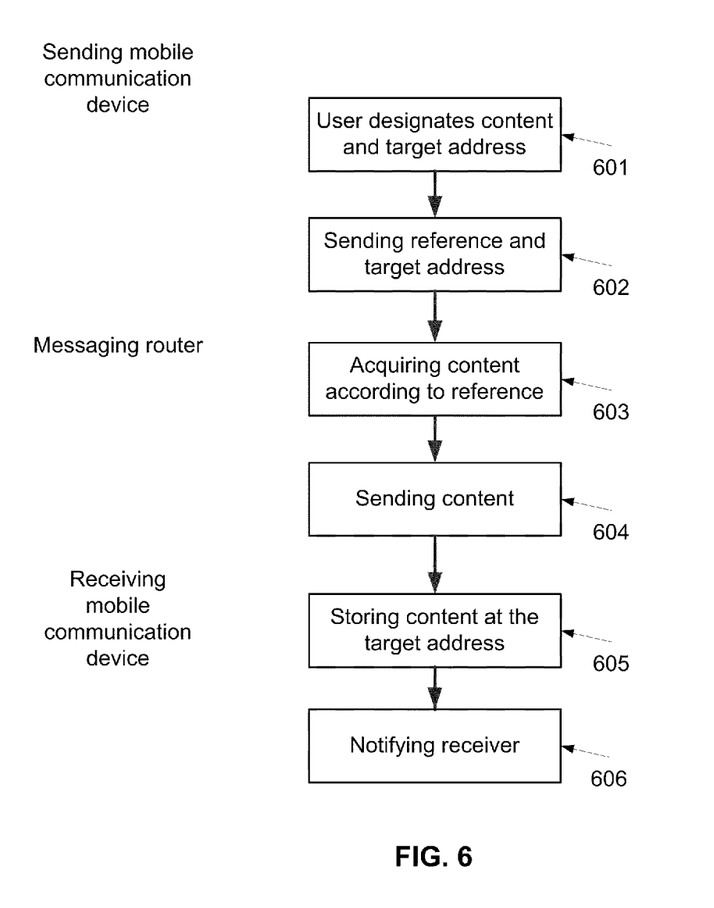
FIG. 6 is a method of using a text message for transmitting content in various sizes and/or types, according to some embodiments of the present invention.

Reference is now made to FIG. 6, which is a method of using a text message for transmitting content in various sizes and/or types, according to some embodiments of the present invention. First, as shown at 601, the user designates content and a target address, such as a telephone number. The designation may be performed by providing a reference, such as a link, to a locally or remotely hosted file, such as an image, a video, a word processor document, a presentation, a PDF document, and the like. Than, as shown at 602, a message that includes the reference and the target address is sent from one of the mobile communication devices 102 to the messaging router 103, for example as described above. Now, as shown at 603, the messaging router 103 acquires the referred data, for example the referred image, video and the like. The acquired data is sent to the target address, for example to an address defined by a matching user record, for example as defined above and shown at 604. Optionally, the messaging router transmits the acquired data according to one or more transmission rules. For example, the acquired data may be sent when a packed based connection is established with the messaging router, in a certain time of the day in which the transmission tariff is low, and/or the like. The message is received by the communication management module 101 of the target mobile communication device 102. The communication management module 101 locally stores the received data, optionally according to its type. The storage is optionally performed in native designated libraries of the receiving mobile communication device. For example, if the received file is an image, it is stored in the image gallery and if the received file is a video it is stored in the video gallery, as shown at 605. Now, as shown at 606, the communication management module 101 of the receiving mobile communication device 102 notifies the received user about the received file, for example by adding an SMS with a link to the local storage to the SMS inbox. In such a manner, different files may be transmitted for example MPEG files, video files, such as AVI, and/or audio files such as WAV MP3 files. The communication management module 101 may convert the files into specific data formats or protocols, such as the 3GPP file format, adaptive multi rate—wideband (AMR/WB) storage format, H.263 format, or wideband and narrow-band-AMR-supported formats. It should be noted that as any file may be sent in the process depicted in FIG. 6, the sender is not limited to a certain size or format. Unlike an MMS message, which is usually limited to a maximum size of 300 kilobytes (kB), due to some limitations on the WAP gateway side, the process depicted in FIG. 6 allows transmitting high resolution images and/or videos without such a size limitation. For example, the size of the transmitted data element may require at least 500 kilobytes, 1 megabyte (MB), 2 megabyte (MB), 4megabyte (MB) and, 8 megabyte (MB) storage space. Moreover, as the received file is locally stored in the mobile communication device 102 before the user is notified about the received data, the period between notifying an addressee about a file designated for him and the presentation of this file is reduced. In such a manner, the user does not have to wait for downloading data sent to him and/or premeditatedly and independently upload it from a referred source even though the size of the data is not fixed according to a known protocol.

According to some embodiments of the present invention, the communication management module 101, and optionally the messaging router 103, is used for allowing a user to operate applications installed in a certain mobile communication device by submitting a text message using another mobile communication device. In such an embodiment, the user may send a text message with one or more command indications to the messaging router 103, instructing it to operate a target mobile communication device 102. Optionally, the command indications are symbols added to the text message and/or the usage of a certain address as a target address for the text message.

Figure 7:
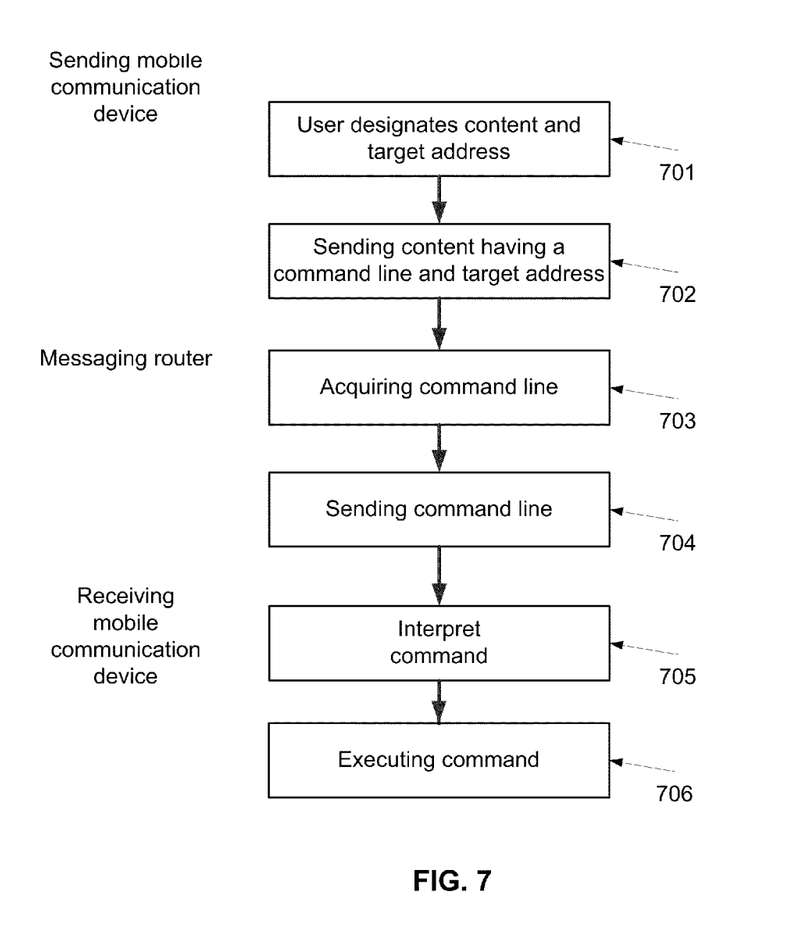
FIG. 7 is a method of using a mobile communication device to operate an application hosted by another mobile communication device by a text message transmission, according to some embodiments of the present invention.

Reference is now made to FIG. 7, which is a method of using a mobile communication device to operate an application hosted by another mobile communication device by a text message transmission, according to some embodiments of the present invention. First, as shown at 701, the user enters or otherwise designates a command to an application hosted by a remote mobile communication device and the address of the remote mobile communication device as a text messaging content, for example using a native SMS UI or a an instant messaging (IM) UI. Optionally, the address is a telephone number provided as the target address of the SMS and the command is a command line, set of characters which have been predefined as operative commands to applications. Optionally, each command line includes command identification, a reference to a commanded application, and a commanded operation for the commanded application, and optionally an input value for defining the commanded operation. The text messages may be used to remotely operate applications such as activate alarm, send SMS, make a call, forward messages, forward calls, block device, operate camera, and/or any combination thereof. For example, the command line is "%ALARM::SET::0600%" where "% denotes a command identification indicating an opening of a command line, %" denotes the ending of the command line, :: denotes a command relation, ALARM denotes the ALARM clock application, SET denotes the action SET, and 0600 denotes an input value for setting the ALARM clock application. Another example is the command line "% CAMERA::ACTIVATE %" wherein CAMERA denotes a camera application and ACTIVATE denotes the activation of the camera. Optionally, a command line includes a number of operations. For example, in the command line "% CAMERA::ACTIVATE&&SENDMMS ::+120145665432", && denotes in addition to previous operation and SENDMMS denotes send output of the camera as an MMS, and +120145665432 denotes the target address of the MMS which is sent by the SENDMMS operation. Optionally, the command line is a unique value indicative of a command to a certain application, for example a unique number and/or a unique character. Optionally, the command line is manually inputted by the user of the mobile communication device. Optionally, the command line is automatically created by designated GUI of the communication management module 101. Other operations, which may be remotely triggered and performed by sending a command line, for example similarly to the described above, includes retrieving an location data from a GPS module installed in the second mobile communication device, retrieving an operator network name, retrieving whether a packed based connection, such as a Wi-Fi connection is established, and optionally for how long, retrieving which applications are currently running, activating installed non native applications such as games and the like. Other modules which may be remotely operated may be Radio-frequency identification (RFID) and/or near field communication (NFC) applications.

Optionally, an operation which may be remotely triggered and performed by sending a command line includes acquiring data from the contact book of the second mobile communication device. For example, the command line may include a contact record such as a name, a surname, an address, a packed based address and/or a telephone number of a contact and the operation that is remotely triggered is the retrieving of one or more contacts with the contact record.

Now, as shown at 702, a message that includes the command line is sent from one of the mobile communication devices 102 to the messaging router 103, for example as described above. As shown at 703, the messaging router 103 acquires the command line, for example extracts it using a text analysis module. Optionally, the messaging router 103 translates the received command, for example, if needed according to the user record which is associated with the target address. The acquired data is sent to the target address, for example to an address defined by a matching user record, for example as defined above and shown at 704. The message is received by the communication management module 101 of the target mobile communication device 102. The communication management module 101 optionally includes a text analysis sub-module set to identify the command identification signs in the received text message. In such a manner, the communication management module 101 may handle regular text messages, as described above in relation to FIGS. 3-5 and/or references, as described above in relation to FIG. 6, together with text messages that include command lines. When the text analysis identifies the command identification signs, it forwards the command line to a command interpreter. Now, the command interpreter of the communication management module 101 may interpret the one or more command lines and operate one or more applications of the receiving mobile communication device, as shown at 705, 706. The applications may be MIDlets, Xlets, Applets, and MPEGlets applications and/or basic applications of the mobile communication device, such as alarm, camera, calendar, SMS service, MMS service, phone service and the like. Optionally, if the application is not active, the command interpreter invokes it. Optionally, the data that is carried by the message enters the application and not stored in the messaging inbox. Optionally, the command interpreter includes and/or connected to a push registry for remote invocation of exemplary mechanisms for J2ME mobile applications or to any other part of the application management system (AMS). Optionally, the push registry is a mobile information device profile (MIDP) 2.0 push registry as defined in www.developers.sun.com/mobility/midp/articles/pushreg/, which is incorporated herein by reference. By triggering components such as the push registry, MIDlets may be launched without user initiation by network -initiated activation. The activation enables an inbound network connection or a timer-based alarm to wake a MIDlet up.

It should be noted that various types of applications may be operated in the process depicted in FIG. 7. Moreover, as the operation is performed by a text message, which may or may be not sent as an SMS, the receiving mobile communication device does not have to be constantly online. Optionally, a password must be sent to facilitate the remote application operation. In such a manner, only authorized users may remotely activate the mobile communication device. Optionally, the password is sent in the body of the text. Additionally or alternatively, only messages from authorized senders may operate applications in the remote device.

It is expected that during the life of a patent maturing from this application many relevant systems and methods will be developed and the scope of the term a module, a router, a network, a link and a mobile communication device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", an and the include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system of transmitting content among a plurality of mobile communication devices, comprising:
    a plurality of transmission management modules installed in a plurality of mobile communication devices, each being adapted to select automatically one of a cellular messaging module and a packet-oriented communication interface to transmit messaging content and a target telephone number via one of a packet-oriented communication link and a cellular communication link;
    wherein each of said transmission management modules selects a respective said cellular messaging module to transmit said messaging content and said target telephone number in a short message service (SMS) message via said cellular communication link when said packet-oriented communication link is not available to said packet-oriented communication interface or when a matching user record associated with said target telephone number is not found;
    wherein each of said transmission management modules selects a respective said packet-oriented communication interface to transmits said messaging content and said target telephone number via said packet-oriented communication link when said packet-oriented communication link is available to said packet-oriented communication interface and when said matching user record is found; and
    a messaging router which receives said content and said target telephone number via said packet-oriented communication link from one of said plurality of mobile communication devices when said packet-oriented communication interface is respectively selected, identifies in said matching user record a target unique identifier (ID) address according to said target telephone number and routes said content to another of said plurality of mobile communication devices according to said target ID address.

2. The system of claim 1, each said plurality of transmission management module being adapted to receive said messaging content from a native user interface (UI) of a respective hosting said mobile communication device.

3. The system of claim 2, wherein said native user interface is selected from a group consisting of a short message service (SMS) UI, an instant messaging (IM) UI and a multimedia messaging service (MMS) UI.

4. The system of claim 1, wherein said content is a text messaging content.

5. The system of claim 1, further comprising a database for storing a plurality of unique ID addresses in association with a different of a plurality of telephone numbers, said messaging router identifying said target unique ID address by comparing between said target telephone number and at least some of said plurality of telephone numbers.

6. The system of claim 1, wherein said packet-oriented communication link is selected from a group consisting of a General packet radio service (GPRS) link, General packet radio service (GPRS) link, EDGE 3G link, wireless application protocol (WAP) link, Wideband Code Division Multiple Access (WCDMA) link, High-Speed Packet Access (HSPA) link, 3GPP long term evolution (LTE) link, a wireless wide area network (WAN) and a local area network (WLAN) link.

7. The system of claim 1, wherein said messaging receives said content in a hypertext transfer protocol (HTTP) or a TCP\IP protocol message.

8. The system of claim 1, wherein said content comprises a data storage address, said messaging router extracts said data storage address from said content and uses said data storage address to acquire a data element, said messaging router automatically routes said data element to said another of said plurality of mobile communication.

9. The system of claim 1, wherein said messaging router automatically routes said data element in a time event defined by at least one rule.

10. The system of claim 1, wherein said content comprises at least application command indication, said another of said plurality of mobile communication devices being configured to perform at least one operation according to said at least application command indication.

11. A method of transmitting content between a plurality of mobile communication devices, comprising:
receiving text messaging content designated for a target telephone number from a first mobile communication device associated with a source address;
automatically selecting to transmit said text messaging content via a first packet-oriented communication link when said packet-oriented communication link is available to a packet-oriented communication interface of said first mobile communication device and when a matching user record stored in a database of user records and associated with said target telephone number is found, said first packet-oriented communication link being established by said packet-oriented communication interface;
automatically selecting to transmit said text messaging content in a short message service (SMS) message via a cellular messaging module of said first mobile communication device when said packet-oriented communication link is not available to said packet-oriented communication interface or when said matching user record is not found;
using said target telephone number to acquire a unique identifier (ID) address of a second mobile communication device from said matching user record; and
routing said text messaging content to said second mobile communication device according to said unique ID address so as to allow said second mobile communication device to process said text messaging content.

12. The method of claim 11, wherein said process said text messaging content comprises presenting said text messaging content to a user.

13. The method of claim 11, wherein said text messaging content comprises at least one data storage address, said using comprises using said data storage address to extract at least one data element and said routing comprises automatically routing said at least one data element to said unique ID address.

14. The method of claim 13, wherein said routing allows said second mobile communication device to store said at least one data element locally before notifying a user thereabout.

15. The method of claim 14, wherein said at least one data element requires at least 1 megabyte (MB) storage space.

16. The method of claim 11, wherein said text messaging content comprises at least application command indication, said second mobile communication device automatically operates at least one hosted application according to said application command indication.

17. The method of claim 16, wherein said at least one hosted application comprises a clock alarm.

18. The method of claim 16, wherein said at least one hosted application comprises an image capturing application.

19. The method of claim 16, wherein said at least one hosted application comprises a communication service application.

20. The method of claim 16, wherein said at least one hosted application comprises a location detection application.

21. The method of claim 16, wherein said at least one hosted application comprises an address book application, said address book application automatically retrieves a contact in response to said at least application command indication.

22. The method of claim 11, wherein said text messaging content comprises a password, said second mobile communication device automatically reads said password and operates at least one hosted application in response.

23. A mobile communication device, comprising:
a user interface which allows a user to designate content and a target telephone number for transmission;
a cellular messaging module set to transmit a message to a communication service center via a cellular network;
a packet-oriented communication interface set to transmit a message to a messaging router via a packet-oriented communication network link; and
a transmission management module which selects one of said cellular messaging module and said packet-oriented communication interface to transmit said content to another mobile communication device having said target telephone number;
wherein said transmission management module automatically selects said cellular messaging module in a short message service (SMS) message when said packet-oriented communication interface is not connected to a packet oriented network or when a matching user record stored in a database of user records and associated with said target telephone number is not found;
wherein said transmission management module automatically selects said packet-oriented communication interface for transmitting said content to another mobile communication device when said packet-oriented communication interface is connected to said packet oriented network and when said matching user record is found;
wherein said target telephone number is associated with a target unique identifier (ID) address stored in a user record and used by said communication service center to route said content in a packet-oriented communication network.

24. The mobile communication device of claim 23, wherein said content is a text messaging content.

25. The mobile communication device of claim 23, further comprising a cost estimator which estimates a cost of transmitting said designated content to said target address using at least one of said cellular messaging module and said packet-oriented communication interface, said transmission management module performing said selecting according to said cost.

26. The mobile communication device of claim 23, wherein said transmission management module performs said selection according to a set of communication rules.

27. The mobile communication device of claim 23, wherein said target address is a target telephone number.

28. The mobile communication device of claim 23, wherein said messaging content and said target telephone number is transmitted as a Transmission Control Protocol Internet Protocol (TCP/IP) message over a wide area network communication link when said packet-oriented communication interface is selected.

\* \* \* \* \*